United States Patent
Parish et al.

(10) Patent No.: US 7,268,783 B2
(45) Date of Patent: Sep. 11, 2007

(54) IMAGE ALIAS REJECTION USING SHAPED STATISTICAL FILTERING

(75) Inventors: Robert W. Parish, Gaston, OR (US);
Scott E. Zink, Portland, OR (US);
Evan Albright, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 476 days.

(21) Appl. No.: 09/992,060

(22) Filed: Nov. 21, 2001

(65) Prior Publication Data

US 2003/0095132 A1    May 22, 2003

(51) Int. Cl.
*G06T 11/20* (2006.01)

(52) U.S. Cl. ............... 345/440.1; 345/94; 345/208; 345/596; 345/599; 382/205; 382/207; 382/228; 382/275; 702/66; 702/67; 702/68; 702/69; 702/72; 702/73; 702/74; 702/81

(58) Field of Classification Search .......... 345/593, 345/596, 599; 702/68
See application file for complete search history.

(56) References Cited

U.S. PATENT DOCUMENTS

| | | | |
|---|---|---|---|
| 4,578,714 A | | 3/1986 | Sugiura et al. |
| 4,586,037 A | | 4/1986 | Rosener et al. |
| 4,816,898 A | | 3/1989 | Farley et al. |
| 5,164,717 A | * | 11/1992 | Wells et al. ............... 345/596 |
| 5,179,641 A | * | 1/1993 | Comins et al. ............ 345/596 |
| 5,264,840 A | * | 11/1993 | Wells et al. ............... 345/599 |
| 5,375,067 A | * | 12/1994 | Berchin ..................... 702/66 |
| 5,404,176 A | | 4/1995 | Lum |
| 5,440,676 A | * | 8/1995 | Alappat et al. ............ 345/443 |
| 5,777,599 A | * | 7/1998 | Poduska, Jr. .............. 345/596 |
| 5,960,122 A | | 9/1999 | Morikawa |
| 6,469,684 B1 | * | 10/2002 | Cole ........................... 345/58 |
| 2002/0005854 A1 | * | 1/2002 | Deering et al. ........... 345/596 |

FOREIGN PATENT DOCUMENTS

| | | |
|---|---|---|
| EP | 0 597 596 A | 5/1994 |
| WO | WO 00 02381 A | 1/2000 |

OTHER PUBLICATIONS

Steven W. Smith "The Scientist and Engineer's Guide to Digital Signal Processing" Second Edition, 1999, p. 30-31, California Technical Publishing, San Diego, CA 92150.

* cited by examiner

*Primary Examiner*—Kee M. Tung
*Assistant Examiner*—Antonio A Caschera
(74) *Attorney, Agent, or Firm*—Francis I. Gray

(57) ABSTRACT

Image alias rejection when converting a high resolution rasterized waveform to a lower resolution rasterized waveform for display uses a statistical filter. The statistical filter provides a shaped probability density function either by combining the outputs of multiple random number generators, such as linear feedback shift registers, or by using a corresponding look-up table to produce a dither signal. The statistical filter may be applied to one or both of the dimensional values for each data point of the high resolution rasterized waveform by combining the dimensional values with the dither signal. The resulting filtered dimensional values may then be subsampled, such as by truncation, to produce values for a lower resolution rasterized waveform display.

4 Claims, 4 Drawing Sheets

IMAGE ALIAS REJECTION USING SHAPED STATISTICAL FILTERING

BACKGROUND OF THE INVENTION

The present invention relates to video processing, and more particularly to a method of image alias rejection using shaped statistical filtering in a waveform rasterizer.

There is a well-known problem in waveform rasterization that, when rasterizing a high resolution waveform onto a limited resolution display, an artifact appears that is sometimes called "jaggies". There are existing "dejaggie" algorithms for line drawing, such as that described in U.S. Pat. No. 4,586,037 by Harvey J. Rosener et al issued Apr. 29, 1986 and entitled "Raster Display Smooth Line Generation", but with video waveforms generally are not lines. The jaggies seen in a rasterized waveform, which is a bit-map display, may be understood as the spatial aliases of an undersampled image. If the waveform is originally rasterized in a much higher resolution, such as 2048×2048, then is subjected to an appropriate spatial low pass filter which "smears" the points over several neighboring pixels of the raster, and then is subsampled to the desired display resolution, such as 640×480, this removes the jaggies. However for this approach the high resolution image needs a very large raster memory. This memory also needs to be very fast due to the needs of waveform rasterization.

Rasterization works by building up an image of plotted x-y values. Each new x-y data point, where x may represent time and y may represent amplitude, adds to the image which is then scanned out in a raster fashion for further processing and/or display. In an ideal rasterizer a new data point may be plotted anywhere in the image without regard to where a previous data point was plotted. One way to deal with the need for low pass filtering is to subject each new input data point to a spatial low pass filter and then plot the outputs of the spatial filter in the desired display resolution memory. However if a 2×2 spatial kernel is used, which is the smallest practical, four memory cycles are needed to plot the output of the spatial filter. Memory bandwidth is often the limiting item in rasterization, so doing four times as many memory cycles is not what is desired.

What is desired is image alias rejection that minimizes the number of display memory cycles.

BRIEF SUMMARY OF THE INVENTION

Accordingly the present invention provides a method of image alias rejection using shaped statistical filtering in a waveform rasterizer which eliminates the need for a high resolution memory and does not use multiplication. High resolution "X" and "Y" data are each combined with a dither value from a shaped random number generator. The combined "X" and "Y" values are then truncated as appropriate for a lower resolution display and stored in a display raster memory.

The objects, advantages and other novel features of the present invention are apparent from the following detailed description when read in conjunction with the appended claims and attached drawing.

DETAILED DESCRIPTION OF THE INVENTION

Figure 1:
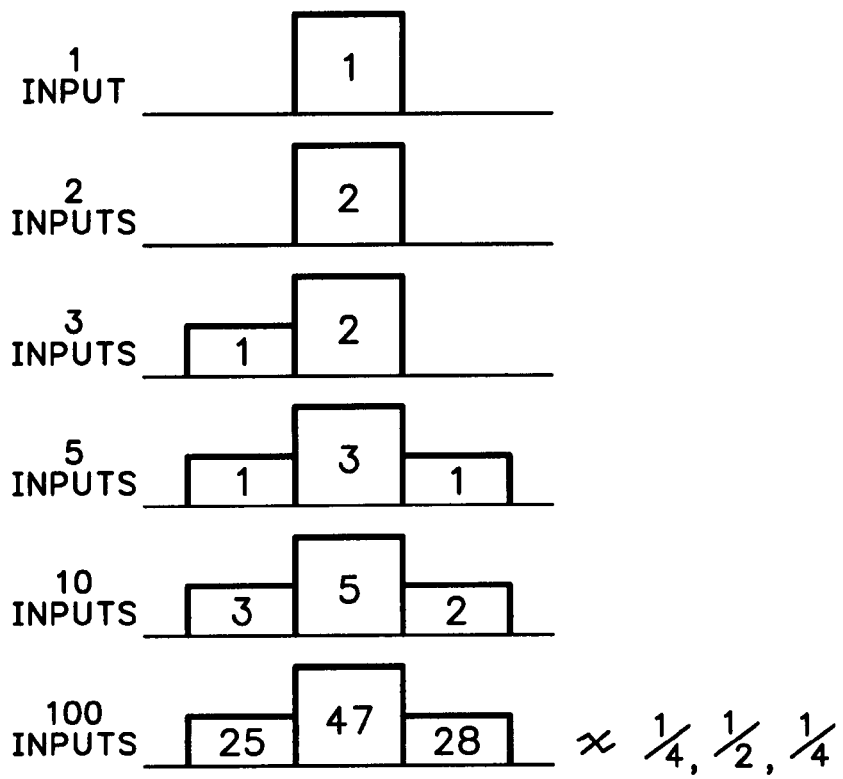
FIG. 1 are representations (a) of a traditional filter kernel and (b) of a statistical filter kernel with corresponding results.

The present invention addresses the image alias rejection problem by filtering with a shaped statistical filter. A simple one-dimensional example is shown in FIG. 1. For a traditional filter implementing a low pass filter for spreading an impulse over several bins, the impulse is passed through a kernel (FIG. 1a) with coefficients of ¼, ½ and ¼ in this example. The coefficients are multiplied by the impulse to provide an output. On the other hand a statistical filter has a random shaped function representing a probability density function for the impulse response of the filter being implemented. In this example (FIG. 1b) the statistical filter puts whatever input is provided in the first bin one-fourth of the time, in the second bin one-half of the time and in the third bin one-fourth of the time. If the impulse is put into the statistical filter many, many times, as is common for portions of a video signal such as sync, color burst, test patterns, etc., the output is approximately the same as for the traditional filter. This is useful in rasterization since the image is made up of many data point plots.

The statistical filter places each data point into a single bin based on the probability density function of the filter. Over time the ensemble response of the filter resembles a traditional filter with an impulse response matching the probability density function of the statistical filter. Examples range from a uniform probability density function corresponding to a rectangular impulse response generated by a single random number generator, to a Gaussian random number generator producing an equivalent gaussian impulse response. This gaussian random number generator may be implemented using the central limit theorem by summing the outputs of several independent and identically distributed random number generators, as shown in FIGS. 2-10, page 31 of "The Scientist and Engineer's Guide to Digital Signal Processing" by Steven W. Smith and published (Second Edition 1999) by California Technical Publishing (www.DSPguide.com).

Figure 2:
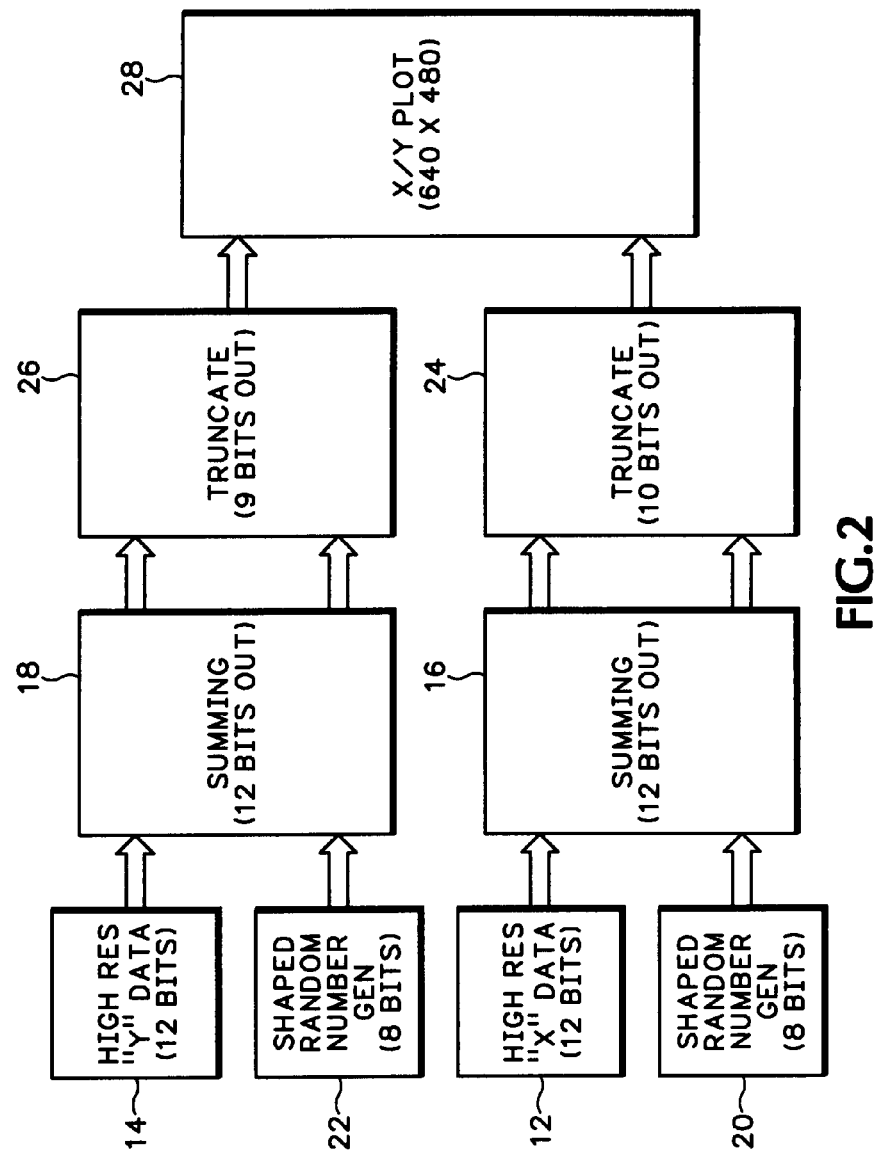
FIG. 2 is a block diagram view of an apparatus for image alias rejection according to the present invention.

Referring now to FIG. 2 the "X" and "Y" data for a waveform sample from respective sources 12, 14 are combined in respective summing circuits 16, 18 at high precision, such as 12 bits, with the dither outputs of respective shaped random number generators 20, 22, where the shape is a function of the number of individual shaped random number generators being summed to provide the dither outputs. The resulting sums are "subsampled" by respective truncation elements 24, 26, such as to 9 or 10 bits depending upon the subsampling required, and stored in a display raster memory as part of a display plotting system 28.

Figure 3:
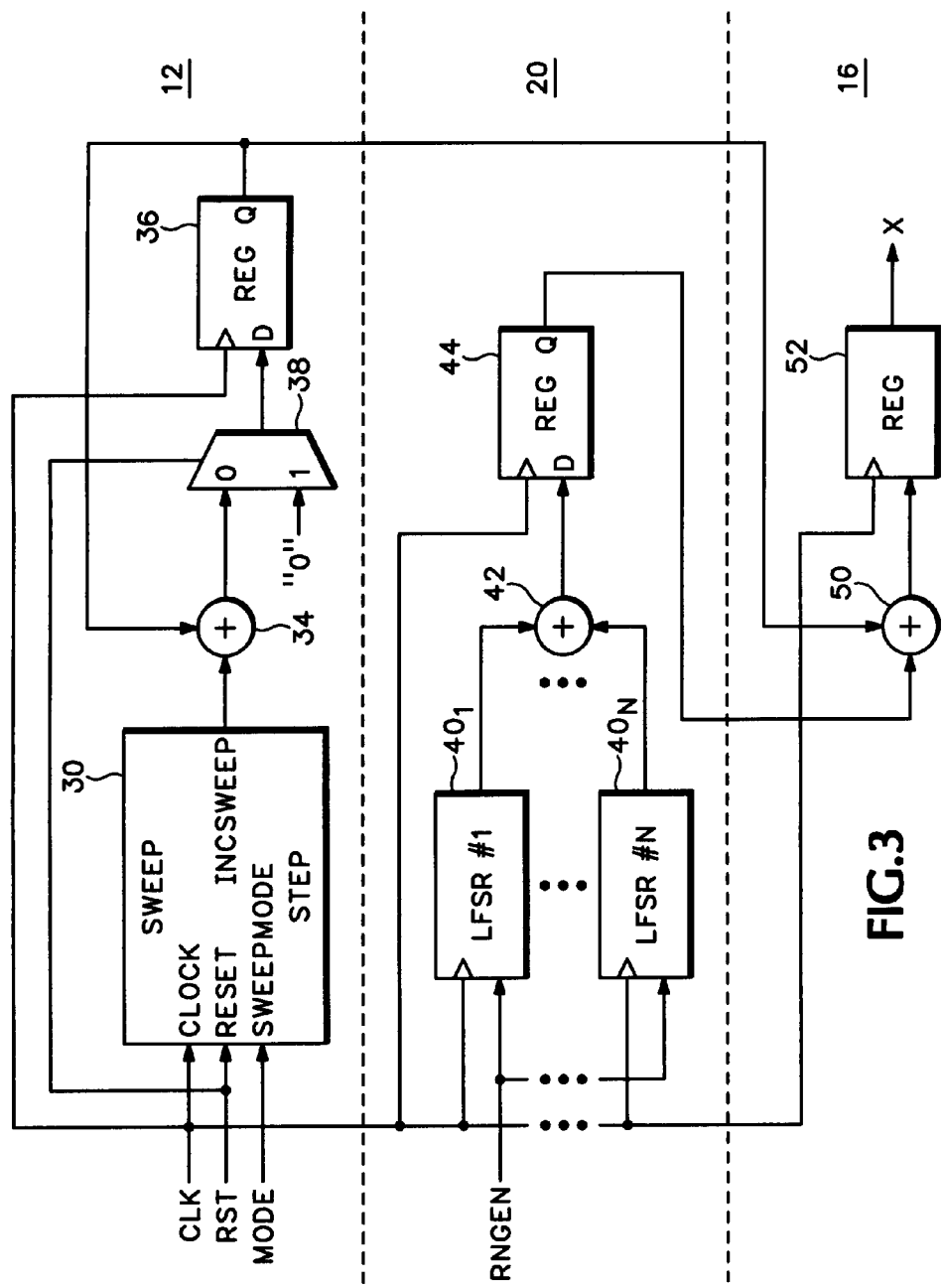
FIG. 3 is a simple schematic view of the apparatus of FIG. 2 according to the present invention.

As shown as an example in FIG. 3, the "X" data source 12 may be in the form of a counter having a sweep step register 30 with inputs from an input clock derived from an input signal such as a video pixel or sample clock, from a sweep reset signal such as a video horizontal line signal, every other horizontal line signal, field signal, frame signal or the like, and from a sweep mode signal which determines a "duty cycle" for the output from the increment register. The output from the sweep step register 30 is either a "1" or a "0", with the duty cycle being a function of the amount of the video signal desired for the high resolution data—one line, two lines, one field, one frame, etc. For example for serial digital video each horizontal line has 1716 samples or pixels, which defines the horizontal scope of the high resolution data. For one line the output of the sweep step register 30, which output is one input to a summation circuit 34, is a constant "1" so that one is added to the output sum of the summation circuit each clock cycle. For two lines the output of the sweep step register 30 is alternating "1"s and "0"s per clock cycle to still provide the 1716 samples for the high resolution data but including samples from two horizontal lines. Likewise for a field the output is "1" followed by 262 "0"s or "1" followed by 261 "0"s depending on the field number for 525 video. The output from the summation circuit 34 is stored in a sweep value register 36 clocked by the input clock via a multiplexer 38. The output from the sweep value register 36 is fed back as a second input to the summation circuit 34 so that the sweep value from the sweep value register is incremented every input clock cycle by the increment step which is either "1" or "0" as described above.

The shaped random number generator 20 may be formed by at least two linear feedback shift registers $40_1 \ldots 40_n$ clocked by the input clock and enabled by an RNG enable signal. The outputs from the linear feedback shift registers 40 are input to a second summation circuit 42, the output of which is a dither signal according to the desired statistical shape function. An RNG register 44 stores the dither signal each cycle of the input clock. Although this implementation uses multiple linear feedback shift registers 40 to form the shaped random number generator 20, the linear feedback shift registers may be replaced with a comparable look-up table.

The dither signal from the RNG register 44 is input to a summation circuit 50 together with the sweep value from the sweep register 36, and then stored in an output register 52 as the filtered "X" value prior to truncation.

Figure 4:
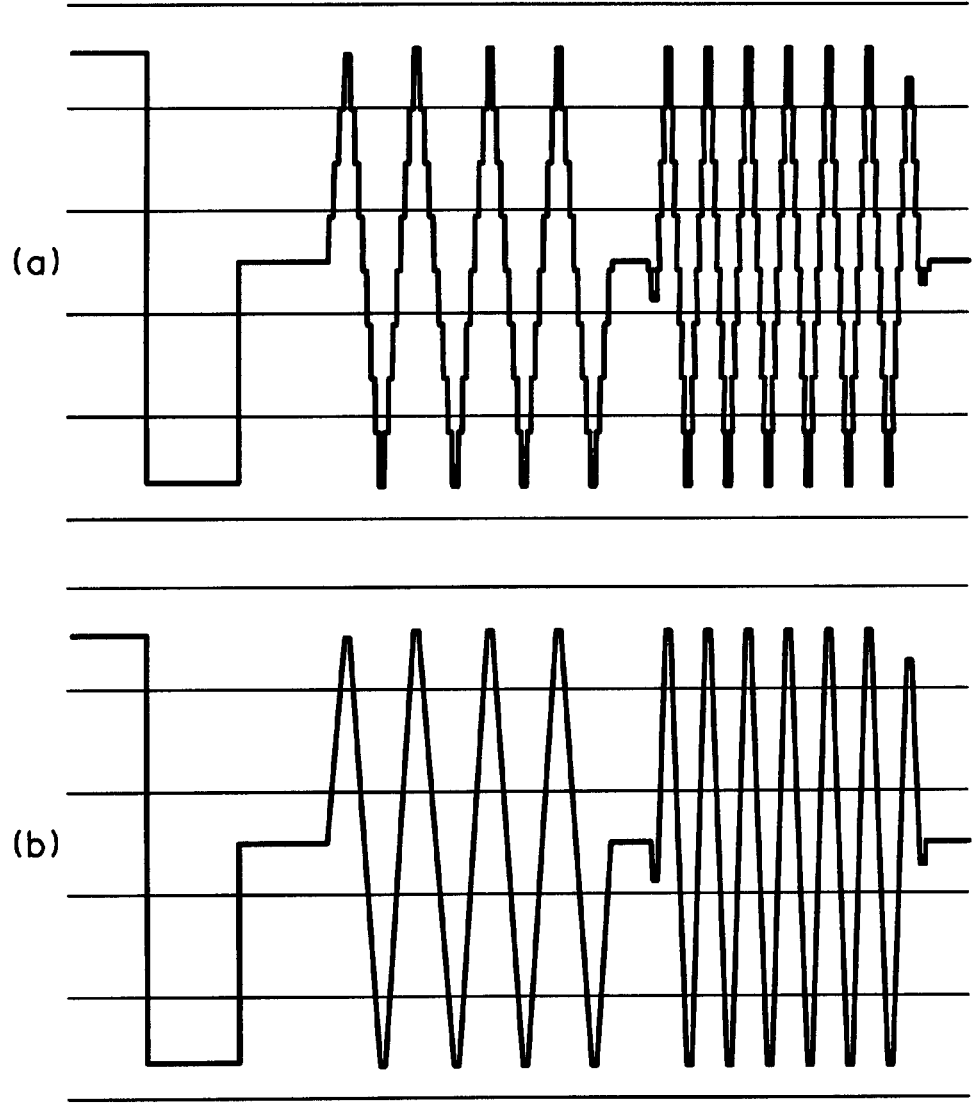
FIG. 4 are plan views of a waveform display (a) without image alias rejection and (b) with image alias rejection according to the present invention.

Referring now to FIG. 4 a typical video waveform is shown (a) without and (b) with image alias rejection as described above. The aliased waveform shows uneven or discontinuous characteristics especially along the vertical portions, while the waveform with image alias rejection shows a smooth characteristic comparable to an analog display.

Thus the present invention provides image alias rejection using a statistical filter for a rasterized waveform image by taking the "X" and/or "Y" data point values and combining them with a dither signal from a shaped random number generator, the result being subsampled or truncated to a desired lower resolution for display.

What is claimed is:

1. An apparatus for image alias rejection of a high resolution rasterized waveform comprising:
   means for generating a shaped dither signal;
   means for summing the shaped dither signal with a dimensional component value of each data point for the high resolution rasterized waveform to produce filtered data point values; and
   means for subsampling the filtered data point values to produce a desired lower resolution rasterized waveform for display.

2. The apparatus as recited in claim 1 wherein the generating means comprises:
   a plurality of linear feedback shift registers, each producing a random number output; and
   means for summing the random number outputs to produce the shaped dither signal.

3. The apparatus as recited in claim 1 wherein the generating means comprises a look-up table containing data corresponding to the shaped dither signal.

4. A method of image alias rejection for a high resolution rasterized waveform comprising the steps of:
   generating a shaped dither signal;
   summing the shaped dither signal with a dimensional component value of each data point for the high resolution rasterized waveform to produce filtered data point values; and
   subsampling the filtered data point values to produce a desired lower resolution rasterized waveform for display.

* * * * *